(12) United States Patent
Woo et al.

(10) Patent No.: US 8,890,772 B2
(45) Date of Patent: Nov. 18, 2014

(54) GLASSES APPARATUS AND POWER SUPPLY APPARATUS

(75) Inventors: Won-myung Woo, Seoul (KR); Jin-hyung Lee, Anyang-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 144 days.

(21) Appl. No.: 13/602,778

(22) Filed: Sep. 4, 2012

(65) Prior Publication Data
US 2013/0187899 A1 Jul. 25, 2013

(30) Foreign Application Priority Data
Jan. 19, 2012 (KR) ........................ 10-2012-0006297

(51) Int. Cl.
*G09G 5/00* (2006.01)
(52) U.S. Cl.
USPC .................................................. 345/6; 345/8
(58) Field of Classification Search
USPC ......................................................... 345/6–8
See application file for complete search history.

(56) References Cited

U.S. PATENT DOCUMENTS

| 5,844,548 | A | * | 12/1998 | Chen et al. | 345/179 |
|---|---|---|---|---|---|
| 6,791,599 | B1 | * | 9/2004 | Okada et al. | 348/56 |
| 8,368,823 | B2 | * | 2/2013 | Watanabe et al. | 348/837 |
| 8,564,579 | B2 | * | 10/2013 | Kwon | 345/207 |
| 2002/0118277 | A1 | * | 8/2002 | Divelbiss et al. | 348/56 |
| 2011/0267387 | A1 | * | 11/2011 | Baik et al. | 345/691 |
| 2011/0285830 | A1 | * | 11/2011 | Kim et al. | 348/56 |
| 2013/0038608 | A1 | * | 2/2013 | Choi et al. | 345/419 |

* cited by examiner

*Primary Examiner* — Chanh Nguyen
*Assistant Examiner* — Roy Rabindranath
(74) *Attorney, Agent, or Firm* — Sughrue Mion, PLLC

(57) ABSTRACT

Glasses apparatus interlocking with a 3D display device is provided. The glasses apparatus includes a shutter glasses unit, a synchronous signal receiving unit receiving a synchronous signal from the 3D display device, a shutter glasses which drives unit driving the shutter glasses unit, a DC/DC converter unit which converts converting a DC voltage provided from a battery, and a control unit which controls the DC/DC converter unit to apply the converted DC voltage to the shutter glasses driving unit through supplying of a PWM signal to the DC/DC converter unit and controlling the shutter glasses driving unit, which is driven by the applied DC voltage, to turn on/off the shutter glasses unit according to the synchronous signal.

14 Claims, 5 Drawing Sheets

GLASSES APPARATUS AND POWER SUPPLY APPARATUS

PRIORITY

This application claims priority under 35 U.S.C. §119(a) to Korean Patent Application No. 10-2012-6297, filed on Jan. 19, 2012 in the Korean Intellectual Property Office, the disclosure of which is incorporated herein by reference.

BACKGROUND

1. Field

The present disclosure relates to glasses apparatus and a power supply apparatus. More particularly, the present disclosure relates to glasses apparatus that alternately display a left-eye image and a right-eye image, and a power supply apparatus.

2. Description of the Related Art 3D stereoscopic image technology has very diverse application fields, such as information communication, broadcasting, medical treatment, educational training, military affairs, games, animation, virtual reality, CAD, industrial technology, and the like. This may be the core basic technology of the next-generation 3D stereoscopic multimedia information communication which is commonly required in these fields.

In general, a 3D effect occurs through complex actions of the degree of change in thickness of a crystalline lens according to the position of an object to be observed, a difference in angle between both eyes and an object, a difference in position and shape of an object between left and right eyes, disparity occurring in accordance with the movement of an object, and other effects caused by various kinds of psychologies and memories.

Among them, the binocular disparity that occurs due to a distance of about 6-7 cm between two human eyes may be the most important factor. Due to the binocular disparity, two eyes see the same object at different angles, and due to this difference in angle between the two eyes, different images are formed on the two eyes, respectively. These two images are transferred to viewer's brain through the retinas, and the brain accurately harmonizes these two kinds of information, resulting in the viewer perceiving the original 3D stereoscopic image.

A 3D display device is divided into a glasses type that uses special glasses and a non-glasses type that does not use the special glasses. The glasses type may be divided into a color filter type that separates and selects an image using a color filter, a polarizing filter type that separates an image into a left-eye image and a right-eye image using a shield effect caused by a combination of orthogonal polarizing elements, and a shutter glasses type that alternately intercepts a left eye and a right eye in accordance with a sync signal for projecting a left-eye image signal and a right-eye image signal onto a screen to allow the viewer to experience the 3D effect.

In the case of using shutter type glasses apparatus there is a requirement that its weight be light to improve the wearing sensation, and material costs are lowered for mass production. Further, there is a requirement to reduce power consumption so that the discharge time of a battery for driving the glasses apparatus is maximally lengthened.

The shutter type glasses apparatus in the related art is configured to include a feedback control circuit to control an output of a DC/DC converter unit that converts an output DC voltage of the battery and provides the converted DC voltage to the glasses apparatus. Accordingly, the number of circuit components is increased which causes the weight and material costs of the glasses apparatus to also be increased. Further, due to the increase in the number of circuit components, the power consumption is increased, and thus it is not possible to maximally lengthen the discharge time of the battery for driving the glasses apparatus.

SUMMARY

The present disclosure has been made to address at least the above problems and/or disadvantages and to provide at least the advantages described below. Accordingly, an aspect of the present disclosure provides a glasses apparatus, which have a light weight in order to improve the wearing sensation, low material costs for mass production, and reduced power consumption so as to maximally lengthen the discharge time of a battery for driving the glasses apparatus, and a power supply apparatus.

According to one aspect of the present disclosure, glasses apparatus interlocking with a 3D display device includes a shutter glasses unit; a synchronous signal receiving unit which receives a synchronous signal from the 3D display device; a shutter glasses driving unit which drives the shutter glasses unit; a DC/DC converter unit converting a DC voltage provided from a battery; and a control unit which controls the DC/DC converter unit to apply the converted DC voltage to the shutter glasses driving unit by supplying of a PWM signal to the DC/DC converter unit, and controlling the shutter glasses driving unit, which is driven by the applied DC voltage, to turn on/off the shutter glasses unit according to the synchronous signal.

The control unit may include a PWM signal generating unit which generates and provides the PWM signal to the DC/DC converter unit; and a comparator unit which receives feedback of the DC voltage output from the DC/DC converter unit and compares the DC voltage with a preset voltage level.

The generated PWM signal may have a fixed duty ratio.

The comparator unit may output a LOW signal in response to the output level of the DC voltage of the DC/DC converter unit being equal to or higher than a first preset level, and output a HIGH signal in response to the level of the output DC voltage of the DC/DC converter unit being equal to or lower than a second preset level.

Further, the control unit may output the generated PWM signal to an output terminal of the comparator unit in response to the comparator unit outputting the LOW signal, and outputs the generated PWM signal to the DC/DC converter unit in response to the comparator unit outputting a HIGH signal.

The DC/DC converter unit may include a first inductor having one end connected to the battery; a first MOSFET having a drain connected to the other end of the first inductor, a source connected to ground, and a gate connected to an output terminal of the PWM generating unit; a first capacitor connected in parallel with the first MOSFET; and a first diode having an anode connected to the drain of the first MOSFET and a cathode connected to the first capacitor and the output voltage terminal.

The control unit may further include a second diode having an anode connected to the output terminal of the PWM generating unit and a cathode connected to the output terminal of the comparator unit.

The glasses according to an aspect of the present disclosure may further include a charging unit which applies a charging voltage to the battery.

According to another aspect of the present disclosure, a power supply apparatus applicable to glasses includes a battery; a DC/DC converter unit which converts a DC voltage provided from the battery; and a control unit which controls the DC/DC converter unit to apply the converted DC voltage to a shutter glasses driving unit for driving shutter glasses by supplying a PWM signal to the DC/DC converter unit, and controlling the shutter glasses driving unit, which is driven by the applied DC voltage, to turn on/off the shutter glasses unit according to a synchronous signal.

The control unit may include a PWM signal generating unit which generates and provides the PWM signal to the DC/DC converter unit; and a comparator unit which receives a feedback of the DC voltage output from the DC/DC converter unit and comparing the DC voltage with a preset voltage level.

The generated PWM signal may have a fixed duty ratio.

The comparator unit may output a LOW signal in response to the level of the output DC voltage of the DC/DC converter unit being equal to or higher than a first preset level, and output a HIGH signal in response to the level of the output DC voltage of the DC/DC converter unit being equal to or lower than a second preset level.

Further, the control unit may output the generated PWM signal to an output terminal of the comparator unit in response to the comparator unit outputting the LOW signal, and outputting the generated PWM signal to the DC/DC converter unit in response to the comparator unit outputting the HIGH signal.

The DC/DC converter unit may include a first inductor having one end connected to the battery; a first MOSFET having a drain connected to the other end of the first inductor, a source connected to ground, and a gate connected to an output terminal of the PWM generating unit; a first capacitor connected in parallel with the first MOSFET; and a first diode having an anode connected to the drain of the first MOSFET and a cathode connected to the first capacitor and the output voltage terminal.

The control unit may further include a second diode having an anode connected to the output terminal of the PWM generating unit and a cathode connected to the output terminal of the comparator unit.

Another aspect of the present disclosure includes a glasses apparatus including shutter glasses, a synchronous signal receiver; a shutter glasses driver which drives the shutter glasses; a DC/DC converter which converts a received DC voltage; and a controller which controls the DC/DC converter to apply the converted DC voltage to the shutter glasses driver by supplying a PWM signal to the DC/DC converter, and controlling the shutter glasses driver to turn on/off the shutter glasses according to a synchronous signal. The synchronous signal receiver may receive a synchronous signal from a 3D display device. The received DC voltage is received from a battery.

BRIEF DESCRIPTION OF THE DRAWINGS

The above and other aspects, features and advantages of the present disclosure will be more apparent from the following detailed description when taken in conjunction with the accompanying drawings, in which.

DETAILED DESCRIPTION OF EMBODIMENTS

Hereinafter, exemplary embodiments of the present disclosure are described in detail with reference to the accompanying drawings.

Figure 1:
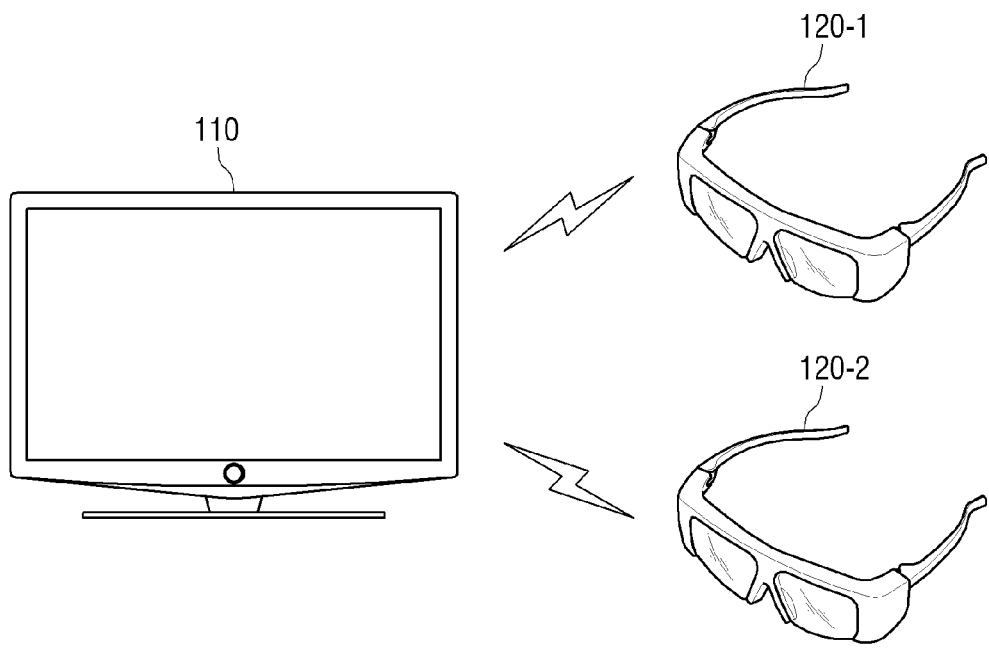
FIG. 1 is a diagram illustrating a 3D image providing system according to an exemplary embodiment of the present disclosure.

FIG. 1 is a diagram illustrating a 3D image providing system 100 according to an exemplary embodiment of the present disclosure. Referring to FIG. 1, the image providing system 100 includes a 3D display device 110 and glasses apparatuses 120-1 and 120-2, respectively.

The 3D display device 110 is a kind of display apparatus, which receives a 3D image that is received from an image capturing device such as a camera or a 3D image that is captured by a camera, edited/processed and output by a broadcasting station, and processes and displays the 3D image on the screen. In particular, the 3D display device 110 may process a left-eye image and a right-eye image with reference to the format of the 3D image, and make the processed left-eye image and right-eye image time-divided and alternately displayed. Further, the 3D display device 110 may generate and transfer to glasses 120-1, a synchronous signal, which is synchronized with the timing in which the left-eye image and the right-eye image are time-divided and displayed. Here, the synchronous signal may be generated through periodic generation of a plurality of pulses for each vertical synchronous signal Vsync of the 3D display device 110.

In this case, the glasses apparatuses 120-1 and 120-2 may enable a user to view a left-eye image and a right-eye image through the left eye and the right eye through alternately turning on/off a left-eye glass and a right-eye glass according to the synchronous signal received from the 3D display device 110.

Further, the 3D display device 110 may simultaneously provide a plurality of content, so that a plurality of users can view different content, respectively.

In this case, the 3D display device 110 alternately displays a plurality of 2D content (for example, content A and content B), and generates a synchronization signal for synchronizing the glasses apparatuses 120-1 and 120-2, which correspond to the respective content to transmit the synchronization signal to the glasses apparatuses 120-1 and 120-2.

In this case, the glasses apparatus 120-1 may turn on the left-eye glass and the right-eye glass when one content A is displayed according to the synchronous signal, and may turn off the left-eye glass and the right-eye glass when the other content B is displayed. Through this, a viewer who wears the glasses apparatus 120-1 can only view the content A that is synchronized with the glasses apparatus 120-1 of the plurality of content A and B being alternately displayed. In the same manner, a viewer who wears the glasses 120-2 can view only the content B.

Hereinafter, referring to FIG. 2, the glasses apparatuses 120-1 and 120-2 according to an exemplary embodiment of the present disclosure will be described in detail.

Figure 2:
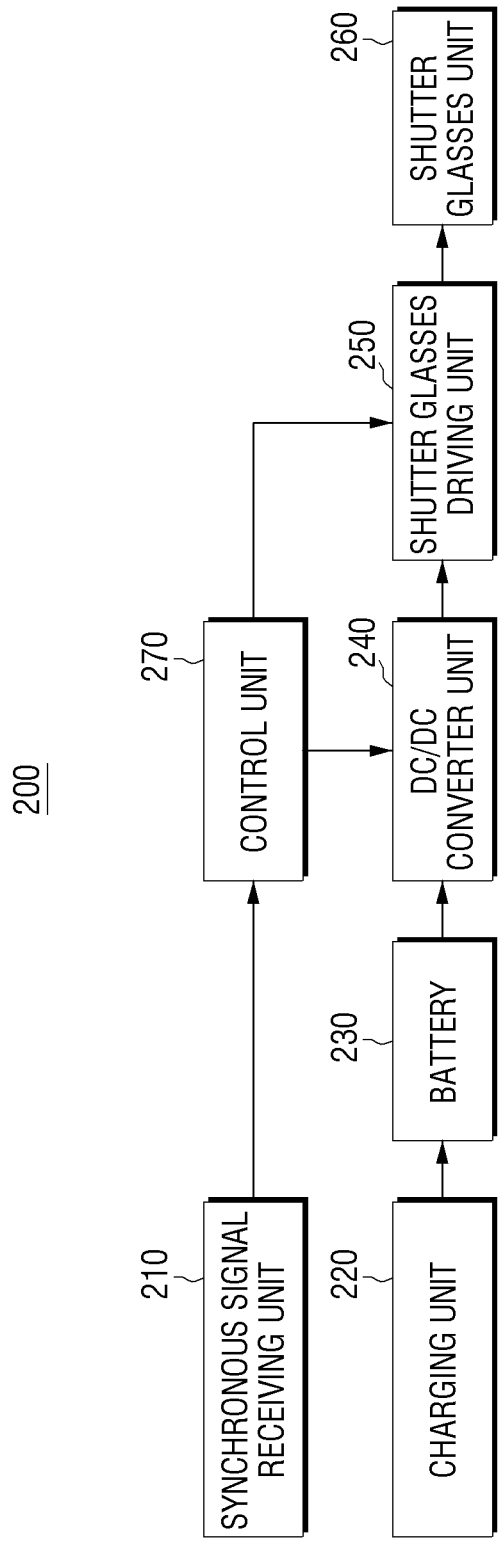
FIG. 2 is a block diagram illustrating the configuration of glasses apparatus according to an exemplary embodiment of the present disclosure.

FIG. 2 is a block diagram illustrating the configuration of the glasses apparatus according to an exemplary embodiment of the present disclosure. Referring to FIG. 2, the glasses apparatus 200 include a synchronous signal receiving unit 210, a charging unit 220, a battery 230, a DC/DC converter unit 240, a shutter glasses driving unit 250, a shutter glasses unit 260, and a control unit 270. Here, the glasses apparatus 200 may be configured to include only part of the above-described configuration.

The synchronous signal receiving unit 210 receives a synchronous signal from the 3D display device 110. Here, the 3D display device 110 may radiate the synchronous signal using infrared rays having directivity, and the synchronous signal receiving unit 210 may receive the synchronous signal from the radiated infrared rays. For example, the synchronous signal that is transferred from the 3D display device 110 to the synchronous signal receiving unit 210 may be an infrared signal having frequencies of 60 Hz, 120 Hz, and 240 Hz.

Further, the synchronous signal receiving unit 210 may be provided with a Bluetooth communication module, perform communications with a Bluetooth communication module of the 3D display device 110, and may receive the synchronization signal in the form of a transmission packet according to the Bluetooth communication standard. Here, the transmission packet according to the Bluetooth communication standard may include time information for synchronizing with the display timing of an image.

The charging unit 220 performs voltage rectification or voltage change so as to charge charging voltage in the battery 230, to be described later.

Here, the charging voltage may be applied from a USB interface unit (not illustrated). That is, the USB interface unit (not illustrated) may be connected to a USB interface unit (not illustrated) of the 3D display device 110 through a USB cable, and may receive DC voltage to be charged in the battery 230.

Further, the glasses apparatus 200 may be charged by power supplied from the 3D display device 110 through a non-contact charging method. Here, the non-contact charging method is a battery charging method using electromagnetic induction that occurs between two metal coils that are opposite to each other. That is, the charging unit 220 of the glasses apparatus 200 for performing wireless charging through the 3D display apparatus 110 may include a secondary coil, a rectifier and a voltage regulator. In this case, if the secondary coil is located in the vicinity of a magnetic field generated by the primary coil provided in the 3D display device 110, electricity flows through the secondary coil by electromagnetic induction. That is, the primary coil and the secondary coil are magnetically coupled to each other, and an induced electromotive force is generated in the secondary coil. The induced electromotive force generated by the above-described method is rectified into a DC voltage by a rectifier. In this case, the rectifier may be composed of four diodes having a bridge diode shape and a capacitor which performs filtering. Of course, not only the rectifier having the above-described shape but also other types of rectifying circuits may be applied to the present disclosure. Further, the voltage regulator regulates the rectified DC voltage to keep a constant voltage. Through the above-described process, the charging unit 220 may generate a DC voltage to be charged by the battery 230.

The battery 230 may provide a DC voltage to the DC/DC converter unit 240. Here, the output DC voltage of the battery 230 used in the glasses apparatus 200 may be 3V to 5V. Further, the battery 230 may be implemented in the form of a battery for charging or may be implemented in the form of a super capacitor.

The DC/DC converter unit 240 converts the DC voltage provided from the battery 230. Further, the DC/DC converter unit 240 may provide the converted DC voltage to the configuration of the glasses apparatus 200. Here, the output DC voltage of the DC/DC converter unit 240 may be changed according to a PWM signal provided from the control unit 270 to be described later. The detailed operation and configuration of the DC/DC converter unit 240 will be described later with reference to FIGS. 3 and 4.

The shutter glasses driving unit 250 generates a driving signal for turning on/off the shutter glasses unit 260 using the synchronous signal received from the synchronous signal receiving unit 210 and the DC voltage provided from the DC/DC converter unit 240.

Specifically, the shutter glasses unit 260 is composed of the left-eye glass and the right-eye glass. In the case where the 3D display device 110 generates and transfers the synchronous signal, which is synchronized with the timing in which the left-eye image and the right-eye image are time-divided and displayed, to the synchronous signal receiving unit 210, the shutter glasses driving unit 250 generates a left-eye glass driving signal for turning on/off the left-eye glass and a right-eye glass driving signal for turning on/off the right-eye glass on the basis of the received synchronous signal the shutter glasses driving unit additionally transfers the generated left-eye glass driving signal to the left-eye glass and transfers the right-eye glass driving signal to the right-eye glass.

Further, consider the case where the 3D display device 110 generates and transmits the synchronous signal to the glasses apparatuses 120-1 and 120-2 for synchronizing the glasses apparatuses 120-1 and 120-2, which correspond to the respective content so that the 3D display device 110 simultaneously provides a plurality of content and a plurality of users can view different content, respectively. The shutter glasses driving unit 250 may generate driving signals for turning on all the left-eye glass and the right-eye glass when one content A is displayed on the basis of the received synchronous signal, and may generate driving signals for turning off the left-eye glass and the right-eye glass when the other content B is displayed. Further, the shutter glasses driving unit 250 may transfer the generated left-eye glass driving signal to the left-eye glass and may transfer the right-eye glass driving signal to the right-eye glass.

As described above, the shutter glasses unit 260 is composed of the left-eye glass and the right-eye glass, and opens/closes the respective glasses according to the on/off signal received from the shutter glass driving unit 250.

The control unit 270 controls the entire operation of the glasses apparatus 200. Specifically, the control unit 270 may control whole or partial operations of the synchronous signal receiving unit 210, the charging unit 220, the battery 230, the DC/DC converter unit 240, the shutter glasses driving unit 250 and the shutter glasses unit 260, which are included in the glasses apparatus 200.

Further, the control unit 270 may control the DC/DC converter unit 240 to apply the converted DC voltage to the shutter glasses driving unit 250 by providing the PWM signal to the DC/DC converter unit 240. The control unit 270 may control the shutter glasses driving unit 250, which is driven by the applied DC voltage, to turn on/off the shutter glasses unit 260, according to the synchronous signal.

Here, the control unit 270 may include a PWM signal generating unit generating and providing the PWM signal to the DC/DC converter unit 240. A comparator unit may receive feedback from the DC voltage output from the DC/DC converter unit 240 and may compare the DC voltage with a preset voltage level.

Here, the PWM signal generated by the PWM signal generating unit may have a fixed duty ratio.

Further, the comparator unit may output a LOW signal in response to the level of the output DC voltage of the DC/DC converter unit 240 being equal to or higher than the first preset level, and may output a HIGH signal in response to the level of the output DC voltage of the DC/DC converter unit 240 being equal to or lower than the second preset level.

Further, the control unit 270 may output the generated PWM signal to an output terminal of the comparator unit in response to the comparator unit outputting the LOW signal, and may output the generated PWM signal to the DC/DC converter unit 240 in response to the comparator unit outputting the HIGH signal. The detailed operation and the configuration of the control unit 270 will be described later, with reference to FIGS. 3 and 4.

Figure 3:
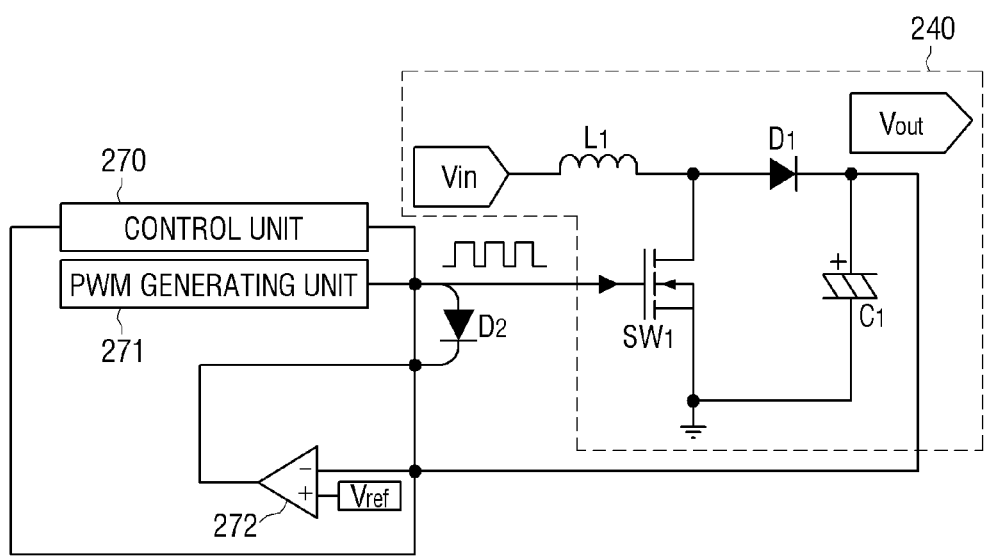
FIGS. 3 and 4 are circuit diagrams illustrating that a control unit in FIG. 2 controls a DC/DC converter unit.
Figure 4:
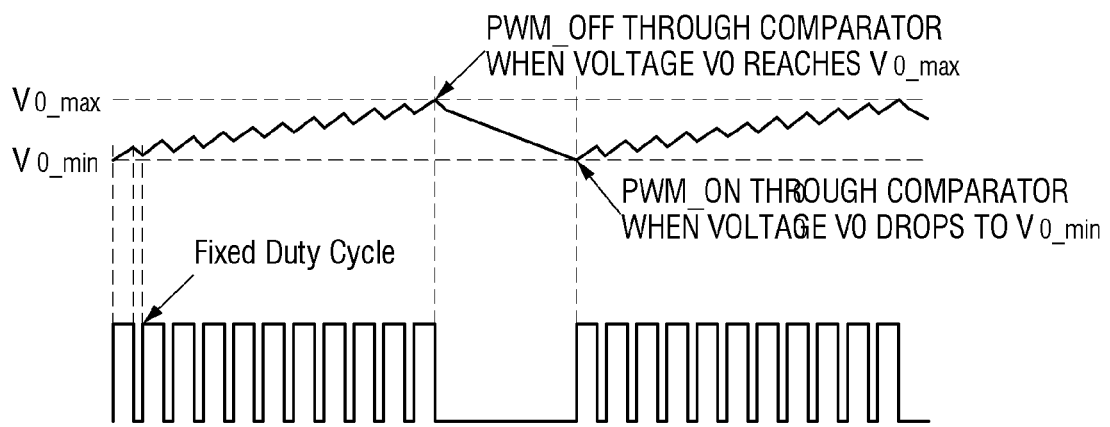

FIGS. 3 and 4 are circuit diagrams which illustrate that the control unit 270 in FIG. 2 controls a DC/DC converter unit 240. Referring to FIG. 3, the DC/DC converter unit 240 includes a first inductor L1 having one end Vin connected to the battery 230, a first MOSFET SW1 having a drain connected to the other end of the first inductor L1, a source connected to ground, and a gate connected to an output terminal of the PWM generating unit 271, a first capacitor C1 connected in parallel with the first MOSFET SW1, and a first diode D1 having an anode connected to the drain of the first MOSFET SW1 and a cathode connected to the first capacitor C1 and the output voltage terminal. Here, the DC/DC converter unit 240 may be implemented as a boost converter.

Further, the control unit 270 includes the PWM signal generating unit 271 generating and providing the PWM signal to the first MOSFET SW1 of the DC/DC converter unit 240, a comparator unit 272 receiving a feedback of the DC voltage Vout output from the DC/DC converter unit 240 and comparing the DC voltage with a preset (reference) voltage level, and a second diode D2 having an anode connected to the output terminal of the PWM generating unit 271 and a cathode connected to the output terminal of the comparator unit 272.

Hereinafter, the detailed operation of the control unit 270 and the DC/DC converter unit 240 will be described. The PWM generating unit 271 generates the PWM signal having the fixed duty ratio, and provides the generated PWM signal having the fixed duty ratio to the gate of the first MOSFET SW1 of the DC/DC converter unit 240. Accordingly, the DC voltage Vin that is provided from the battery is boosted to Vout=Vin*{1/(1−Duty)} by the PWM signal having the fixed duty ratio, that is provided to the gate of the first MOSFET SW1 of the DC/DC converter unit 240.

In this case, the duty ratio of the PWM signal generated by the PWM generating unit 271 is fixed, and since a feedback control circuit for controlling the output DC voltage Vout is not provided in the DC/DC converter unit 240, the output DC voltage Vout is continuously increased over an allowable output voltage.

Accordingly, in order to prevent the output DC voltage Vout from being continuously increased over the allowable output voltage, the comparator unit 272 of the control unit 270 monitors the output DC voltage Vout. In this case, the comparator unit 272 receives the feedback of the output DC voltage Vout and compares the output DC voltage Vout with a preset voltage level Vref.

Here, the comparator unit 272 outputs the LOW signal in response to the level of the output DC voltage Vout of the DC/DC converter unit 240 being equal to or higher than the first preset level, and outputs the HIGH signal in response to the level of the output DC voltage Vout of the DC/DC converter unit 240 being equal to or lower than the second preset level.

If the comparator unit 272 outputs the LOW signal, a forward voltage is applied to the second diode D2, and thus the PWM signal having the fixed duty ratio, which is generated by the PWM generating unit 271, is output to the output terminal of the comparator unit 272 through the second diode D2. Accordingly, the PWM signal having the fixed duty ratio is not provided to the gate of the first MOSFET SW1 of the DC/DC converter unit 240, and thus the boost operation of the DC/DC converter unit 240 is stopped. Accordingly, the increase of the output DC voltage Vout is stopped, and the voltage charged in the first capacitor C1 is discharged to lower the output DC voltage Vout.

If the comparator unit 272 outputs the HIGH signal, a reverse voltage is applied to the second diode D2, and thus the PWM signal having the fixed duty ratio, which is generated by the PWM generating unit 271, is not output through the second diode D2, but is provided to the gate of the first MOSFET SW1 of the DC/DC converter unit 240. Accordingly, the PWM signal having the fixed duty ratio is provided to the first MOSFET SW1 of the DC/DC converter 240, and thus the DC/DC converter unit 240 performs the boost operation. Accordingly, the output DC voltage Vout is increased up to the allowable voltage. As the above-described operation continues, the output DC voltage Vout is controlled to be in an open loop state.

Accordingly, since the control unit 270 generates only the PWM signal having the fixed duty ratio, adjusting the duty ratio of the PWM signal is not required, and thus the power consumption required to adjust the duty ratio of the PWM signal of the control unit 270 can be eliminated.

Further, since a separate feedback control circuit for adjusting the output DC voltage in the DC/DC converter 240 is not used, the power consumption required to operate the feedback control circuit can be eliminated.

Further, since the number of circuit components being used is reduced in comparison to the glasses in the related art, the weight of the glasses becomes reduced so as to be light, and the material costs are reduced as well.

That is, the shutter glasses of the related art are configured to include a feedback control circuit for controlling the output DC voltage of the DC/DC converter unit which converts the output DC voltage of the battery and provides the converted DC voltage to the glasses. Further, the feedback control circuit requires adjusting the duty ratio of the PWM signal in order to control the output DC voltage. Accordingly, the number of circuit components is increased which causes the weight and material costs for the glasses apparatus to also to be increased. Further, due to the increase of the number of circuit components and the control to adjust the duty ratio of the PWM signal, the power consumption is increased, and thus it is not possible to, lengthen, to a maximum valve, the discharge time of the battery for driving the glasses apparatus. In contrast, according to the glasses apparatus 200, according to an exemplary embodiment of the present disclosure, the above-described problems can be solved.

Referring to FIG. 4, it can be seen that the output level of the DC voltage of the DC/DC converter unit 240 is changed within a preset level range. Since the duty ratio of the PWM signal generated by the PWM generating unit 271 is fixed and the feedback control circuit for controlling the output DC voltage Vout is not provided in the DC/DC converter unit 240, the output DC voltage Vout is continuously increased over the allowable output voltage Vo_max. Accordingly, in order to prevent the output DC voltage Vout from being continuously increased over the allowable output voltage Vo_max, the comparator unit 272 of the control unit 270 monitors the output DC voltage Vout. In this case, the comparator unit 272 receives the feedback of the output DC voltage Vout and compares the output DC voltage Vout with the preset voltage levels Vo_max and Vo_min.

Here, the comparator unit 272 outputs the LOW signal if the level of the output DC voltage Vout of the DC/DC converter unit 240 is equal to or higher than the first preset level Vo_max, and outputs the HIGH signal if the level of the output DC voltage Vout of the DC/DC converter unit 240 is equal to or lower than the second preset level Vo_min.

Accordingly, the output DC voltage Vout is changed within the preset level range.

Figure 5:
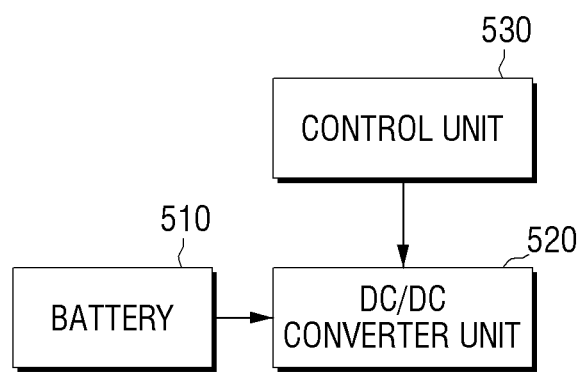
FIG. 5 is a block diagram illustrating the configuration of a power supply apparatus according to an exemplary embodiment of the present disclosure.

FIG. 5 is a block diagram illustrating the configuration of a power supply apparatus according to an exemplary embodiment of the present disclosure. Referring to FIG. 5, a power supply apparatus 500 includes a battery 510, a DC/DC converter unit 520, and a control unit 530. Here, the power supply apparatus 500 is applicable to the glasses apparatus 200. Referring to FIG. 5, since the detailed configuration has already been described with reference to FIG. 2, the detailed description thereof will be omitted.

The DC/DC converter unit 520 may convert the DC voltage provided from the battery 510 and output the converted DC voltage. Here, the output DC voltage of the DC/DC converter unit 520 may be changed according to the PWM signal provided from the control unit 530 to be described layer. Since the detailed operation and the configuration of the DC/DC converter unit 520 have been described with reference to FIGS. 3 and 4, the detailed description thereof will be omitted.

The control unit 530 controls the entire operation of the power supply apparatus 500. Specifically, the control unit 530 may wholly or partially control operation of the battery 510 and the DC/DC converter unit 520.

Further, the control unit 530 may control the DC/DC converter unit 520 to apply the converted DC voltage to the shutter glasses driving unit for driving the shutter glasses provided on the glasses apparatus through providing of the PWM signal to the DC/DC converter unit 520, and may control the shutter glasses driving unit, which is driven by the applied DC voltage, to turn on/off the shutter glasses unit according to the synchronous signal.

Here, the control unit 530 may include a PWM signal generating unit which generates and provides the PWM signal to the DC/DC converter unit 520, and a comparator unit which receives a feedback of the DC voltage output from the DC/DC converter unit 520 and compares the DC voltage with a preset voltage level. Here, the PWM signal generated by the PWM signal generating unit may have a fixed duty ratio.

Further, the comparator unit may output a LOW signal in response to the level of the output DC voltage of the DC/DC converter unit 520 being equal to or higher than the first preset level, and output a HIGH signal in response to the level of the output DC voltage of the DC/DC converter unit 520 being equal to or lower than the second preset level.

Further, the control unit 530 may output the generated PWM signal to an output terminal of the comparator unit in response to the comparator unit outputting the LOW signal, and outputting the generated PWM signal to the DC/DC converter unit 520 in response to the comparator unit outputting the HIGH signal. Since the detailed operation and the configuration of the control unit 530 have been described with reference to FIGS. 3 and 4, the detailed description thereof will be omitted.

According to various exemplary embodiments of the present disclosure as described above, since the control unit generates only the PWM signal having a fixed duty ratio, adjusting the duty ratio of the PWM signal is not required, and thus the power consumption required to adjust the duty ratio of the PWM signal of the control unit can be eliminated.

Further, since a separate feedback control circuit for adjusting the output DC voltage in the DC/DC converter is not used, the power consumption required to operate the feedback control circuit can be eliminated.

Further, since the number of circuit components being used is reduced in comparison to the glasses apparatus in the related art, the weight of the glasses apparatus becomes lighter, and the material costs are reduced.

While the present disclosure has been shown and described with reference to certain embodiments thereof, it will be understood by those skilled in the art that various changes in form and detail may be made therein without departing from the spirit and scope of the present disclosure, as defined by the appended claims.

What is claimed is:

1. A glasses apparatus interlocking with a 3D display device, the glasses apparatus comprising:
   a shutter glasses;
   a synchronous signal receiver which receives a synchronous signal from the 3D display device;
   a shutter glasses driver which drives the shutter glasses;
   a DC/DC converter which converts a DC voltage provided from a battery; and
   a controller which controls the DC/DC converter to apply the converted DC voltage to the shutter glasses driver through supplying of a PWM signal to the DC/DC converter, and controlling the shutter glasses driver, which is driven by the applied DC voltage, to turn on/off the shutter glasses according to the synchronous signal,
   wherein the controller comprises:
   a PWM signal generator which generates and provides the PWM signal to the DC/DC converter; and
   a comparator which receives a feedback of the DC voltage output from the DC/DC converter and compares the DC voltage with a preset voltage level,
   wherein the comparator outputs a LOW signal in response to the level of the output DC voltage of the DC/DC converter being equal to or higher than a first preset level, and outputs a HIGH signal in response to the level of the output DC voltage of the DC/DC converter being equal to or lower than a second preset level.

2. The glasses apparatus as claimed in claim 1, wherein the generated PWM signal has a fixed duty ratio.

3. The glasses apparatus as claimed in claim 1, wherein the controller outputs the generated PWM signal to an output terminal of the comparator in response to the comparator outputting the LOW signal, and outputs the generated PWM signal to the DC/DC converter unit in response to the comparator outputting the HIGH signal.

4. The glasses apparatus as claimed in claim 1, wherein the DC/DC converter comprises:
   a first inductor having one end connected to the battery;
   a first MOSFET having a drain connected to the other end of the first inductor, a source connected to ground, and a gate connected to an output terminal of the PWM generator;
   a first capacitor connected in parallel to the first MOSFET; and
   a first diode having an anode connected to the drain of the first MOSFET and a cathode connected to the first capacitor and the output voltage terminal.

5. The glasses apparatus as claimed in claim 4, wherein the controller further comprises a second diode having an anode connected to the output terminal of the PWM generator and a cathode connected to the output terminal of the comparator.

6. The glasses apparatus as claimed in claim 1, further comprising a charger applying a charging voltage to the battery.

7. A power supply apparatus applicable to a glasses apparatus, the power supply apparatus comprising:
a battery;
a DC/DC converter which converts a DC voltage provided from the battery; and
a controller which controls the DC/DC converter to apply the converted DC voltage to a shutter glasses driver for driving shutter glasses provided in the glasses apparatus by supplying a PWM signal to the DC/DC converter, and controlling the shutter glasses driver, which is driven by the applied DC voltage, to turn on/off the shutter glasses, according to a synchronous signal,
wherein the controller comprises:
a PWM signal generator which generates and provides the PWM signal to the DC/DC converter; and
a comparator which receives a feedback of the DC voltage output from the DC/DC converter and compares the DC voltage with a preset voltage level,
wherein the comparator outputs a LOW signal in response to the level of the output DC voltage of the DC/DC converter being equal to or higher than a first preset level, and outputs a HIGH signal in response to the level of the output DC voltage of the DC/DC converter being equal to or lower than a second preset level.

8. The power supply apparatus as claimed in claim 7, wherein the generated PWM signal has a fixed duty ratio.

9. The power supply apparatus as claimed in claim 7, wherein the controller outputs the generated PWM signal to an output terminal of the comparator in response to the comparator outputting the LOW signal, and outputs the generated PWM signal to the DC/DC converter in response to the comparator unit outputting the HIGH signal.

10. The power supply apparatus as claimed in claim 7, wherein the DC/DC converter comprises:
a first inductor having one end connected to the battery;
a first MOSFET having a drain connected to the other end of the first inductor, a source connected to ground, and a gate connected to an output terminal of the PWM generator;
a first capacitor connected in parallel to the first MOSFET; and
a first diode having an anode connected to the drain of the first MOSFET and a cathode connected to the first capacitor and the output voltage terminal.

11. The power supply apparatus as claimed in claim 10, wherein the controller further comprises a second diode having an anode connected to the output terminal of the PWM generator and a cathode connected to the output terminal of the comparator.

12. A glasses apparatus comprising:
a shutter glasses;
a synchronous signal receiver;
a shutter glasses driver which drives the shutter glasses;
a DC/DC converter which converts a received DC voltage; and
a controller which controls the DC/DC converter to apply the converted DC voltage to the shutter glasses driver by supplying a PWM signal to the DC/DC converter, and controlling the shutter glasses driver to turn on/off the shutter glasses according to a synchronous signal,
wherein the controller comprises:
a PWM signal generator which generates and provides the PWM signal to the DC/DC converter; and
a comparator which receives a feedback of the DC voltage output from the DC/DC converter and compares the DC voltage with a preset voltage level,
wherein the comparator outputs a LOW signal in response to the level of the output DC voltage of the DC/DC converter being equal to or higher than a first preset level, and outputs a HIGH signal in response to the level of the output DC voltage of the DC/DC converter being equal to or lower than a second preset level.

13. The glasses apparatus of claim 12, wherein the synchronous signal receiver receives a synchronous signal from a 3D display device.

14. The glasses apparatus of claim 12 wherein the received DC voltage is received from a battery.

* * * * *